(12) United States Patent
Govindan et al.

(10) Patent No.: US 10,888,820 B2
(45) Date of Patent: Jan. 12, 2021

(54) OSMOTIC MEMBRANE

(71) Applicant: Gradiant Corporation, Woburn, MA (US)

(72) Inventors: Prakash Narayan Govindan, Melrose, MA (US); Looh Tchuin Choong, Somerville, MA (US)

(73) Assignee: Gradiant Corporation, Woburn, MA (US)

( * ) Notice: Subject to any disclaimer, the term of this patent is extended or adjusted under 35 U.S.C. 154(b) by 249 days.

(21) Appl. No.: 15/786,973

(22) Filed: Oct. 18, 2017

(65) Prior Publication Data

US 2018/0104649 A1   Apr. 19, 2018

Related U.S. Application Data

(60) Provisional application No. 62/410,170, filed on Oct. 19, 2016.

(51) Int. Cl.
| | | |
|---|---|---|
| *B01D 61/02* | (2006.01) | |
| *B01D 61/14* | (2006.01) | |
| *B01D 71/56* | (2006.01) | |
| *B01D 71/64* | (2006.01) | |
| *C02F 1/44* | (2006.01) | |

(Continued)

(52) U.S. Cl.
CPC ......... *B01D 61/025* (2013.01); *B01D 61/022* (2013.01); *B01D 61/14* (2013.01); *B01D 69/02* (2013.01); *B01D 69/10* (2013.01); *B01D 69/12* (2013.01); *B01D 71/56* (2013.01); *B01D 71/64* (2013.01); *B01D 71/68* (2013.01); *C02F 1/441* (2013.01); *C02F 1/444* (2013.01); *B01D 2311/25* (2013.01); *B01D 2323/24* (2013.01);

(Continued)

(58) Field of Classification Search
CPC .... B01D 61/022; B01D 61/025; B01D 61/14; B01D 69/02; B01D 69/10; B01D 69/12; B01D 71/56; B01D 71/64; B01D 71/68; B01D 2323/24; B01D 2323/39; B01D 2311/25; B01D 2325/04; C02F 1/441; C02F 1/444
See application file for complete search history.

(56) References Cited

U.S. PATENT DOCUMENTS

| | | |
|---|---|---|
| 8,216,473 B2 | 7/2012 | Wohlert |
| 8,840,792 B2 | 9/2014 | Wohlert |

(Continued)

FOREIGN PATENT DOCUMENTS

| | | |
|---|---|---|
| KR | 101 572 660 B1 | 11/2015 |
| WO | 2008137082 A1 | 11/2008 |
| WO | 2015021062 A1 | 2/2015 |
| WO | 2017019944 A1 | 2/2017 |

OTHER PUBLICATIONS

USPTO, International Search Report and Written Opinion for PCT/US2017/057186 (Dec. 18, 2017) (corresponding PCT application).

(Continued)

*Primary Examiner* — John Kim
(74) *Attorney, Agent, or Firm* — Modern Times Legal; Robert J. Sayre

(57) ABSTRACT

An osmotic membrane comprises an active layer and a composite support layer. The active layer selectively allows passage of water molecules but rejects at least some dissolved ions. The composite support layer includes a side that is bonded to the active layer and comprises an electrospun-fiber sub-layer and a phase-inversion sub-layer.

25 Claims, 3 Drawing Sheets

(51) Int. Cl.
B01D 69/02 (2006.01)
B01D 69/12 (2006.01)
B01D 69/10 (2006.01)
B01D 71/68 (2006.01)

(52) U.S. Cl.
CPC ...... B01D 2323/39 (2013.01); B01D 2325/04 (2013.01)

(56) References Cited

U.S. PATENT DOCUMENTS

2012/0318729 A1  12/2012  Yip et al.
2014/0008291 A1  1/2014   Tang et al.
2016/0001235 A1  1/2016   Frisk

OTHER PUBLICATIONS

Alberto Tiraferri, et al., "Relating performance of thin-film composite forward osmosis membranes to support layer formation and structure", 367 Journal of Membrane Science 340-352 (Nov. 12, 2010).

Robert Burk, "New Technology Spotlight", 2 CaribDA News 6-7( Fall 2012).

Jeong-Hoon Kim, et al., "Effect of PEG additive on membrane formation by phase inversion", J138 Journal of Membrane Science 153-163 (1998).

Intellectual Property Office of Singapore, Written Opinion for SG App. No. 11201903202V (related foreign application) (May 2, 2020).

European Patent Office, Search Report and Written Opinion for EP 17862317.9 (related foreign application) (May 20, 2020).

Guo-Rong Xu, et al., "Polyamide nanofilm composite membranes (NCMs) supported by chitosan coated electrospun nanofibrous membranes: Preparation and separation performance research," 328 Desalination 31-41 (Sep. 13, 2013).

D. R. Yang, et al., "(229d) Theoretical Analysis and Economic Evaluation of Draw Solution Assisted Reverse Osmosis Process," 2015 AIChE Annual Meeting Proceedings (Nov. 9, 2015).

L. Yung, et al., "Fabrication of thin-film nanofibrous composite membranes by interfacial polymerization using ionic liquids as additives," 365 J. of Membrane Sci. 52-58 (Dec. 1, 2020).

OSMOTIC MEMBRANE

BACKGROUND

Membrane separation is a process that selectively removes one or more components from a stream and allows the remaining components through the selective barrier via a sieving and/or sorption diffusion mechanism. Since the components to be removed are different for various applications, different designs of membranes have been used. The types of membrane are commonly classified based on the pore size of the membranes, as shown in FIG. 1.

For reverse osmosis (RO), the "pore" of the membrane is actually the spacing between the polymer chains that the water molecules have to diffuse through. An RO membrane is generally used for the removal of dissolved ions, e.g., sodium, calcium, magnesium, chloride, bromide, etc. RO processes typically require high operating pressure (e.g., greater than 0.5 MPa) because the osmotic pressure of the feed must be overcome to produce purified water with reduced salinity. The water production rate (J) is a function of the applied hydraulic pressure, as shown in the following equation:

$$J=A(\Delta P-\Delta \pi), \quad (1)$$

where A is the pure water permeability constant of the membrane; $\Delta P$ is the hydraulic pressure gradient (defined as the difference in pressure between the feed/retentate side and the permeate side of the membrane); and $\Delta \pi$ is the osmotic pressure gradient (defined as the difference in osmotic pressure between the feed/retentate side of the membrane's active layer and the permeate side of the membrane's active layer). The RO membrane is designed such that it can handle the applied hydraulic pressure without bursting or undergoing strain sufficient to cause mechanical defects in the active layer.

The state-of-the-art RO membrane 10 has a thin film composite structure, as shown in FIG. 2. The top, thin-film layer of polyamide 12 is the main selective barrier to the dissolved salt in the water, and it is approximately 200-nm thick. Since the top layer 12 is thin, it is supported by a polysulfone porous film layer 14 that is about 50-μm thick. A 100-μm thick polyester non-woven support fabric 16 is used as the base layer in order to provide more mechanical strength to the membrane.

The RO process has been recognized as being the most energy-efficient process for desalination. The RO process, however, has been found to be unsuited for desalinating feed solution with a salt concentration of about 50,000 parts per million (ppm) or higher. The main reason for this unsuitability is that the hydraulic pressure required for reasonable recovery of purified water can compromise the membrane.

SUMMARY

Methods and apparatus for osmotic processes are described herein, where various embodiments of the apparatus and methods may include some or all of the elements, features and steps described below.

An osmotic membrane comprises an active layer and a composite support layer. The active layer selectively allows passage of water molecules but rejects at least some dissolved ions. The composite support layer includes a side that is bonded to the active layer and comprises an electrospun-fiber sub-layer and a phase-inversion sub-layer.

The osmotic membrane can be fabricated by electrospinning an electrospun-fiber sub-layer, casting a phase-inversion sub-layer on the electrospun-fiber sub-layer, and forming an active layer on the phase-inversion sub-layer, wherein the active layer that selectively allows passage of water molecules but rejects at least some dissolved ions.

The membrane can be used to perform reverse osmosis by flowing a feed liquid comprising water and dissolved ions at a first pressure across a feed side of the active layer opposite from the side of the active layer that is bonded to the composite support layer, flowing a draw liquid at a second pressure that is lower than the first pressure along a draw side of the composite support layer opposite from the bonded side of the composite support layer, and using the active layer to retain at least some of the dissolved ions from the feed liquid, as retentate while passing purified water as permeate through the active layer and through the composite support layer into the draw liquid.

The membrane described herein can have both a low structural parameter and high mechanical strength so as to make the CFRO process feasible. The membrane can achieve a fine balance between having sufficient mechanical strength and exhibiting a low internal concentration polarization in the support layer. The electrospun (ES) membrane is highly porous (e.g., having greater than 90% porosity); and the pore structures are highly interconnected, thereby producing a low structural parameter that reduces the internal concentration polarization. The phase-inversion (PI) membrane is denser (porosity ~50-70%), but it has better mechanical properties compared to the ES membrane. Thus, by having an ES-PI composite, the thickness of each layer can be fine-tuned such that an optimized support layer can be obtained.

Counter-flow reverse osmosis (CFRO), as described herein, can overcome the above-described hydraulic-pressure limit via use of the membrane structure, described herein. In a conventional RO process, the $\Delta \pi$ in Eq. 1 is equal to the osmotic pressure of the feed solution because the permeate is purified water; and the osmotic pressure of purified water is zero. In CFRO, a saline stream (draw) is introduced to the permeate side to reduce the osmotic pressure gradient ($\Delta \pi$) across the membrane so that the required trans-membrane pressure ($\Delta P$) can be lowered to a level that does not compromise the membrane, while still resulting in a positive flux (J). Alternatively, at the same $\Delta P$, more purified water can be produced.

Figure 1:
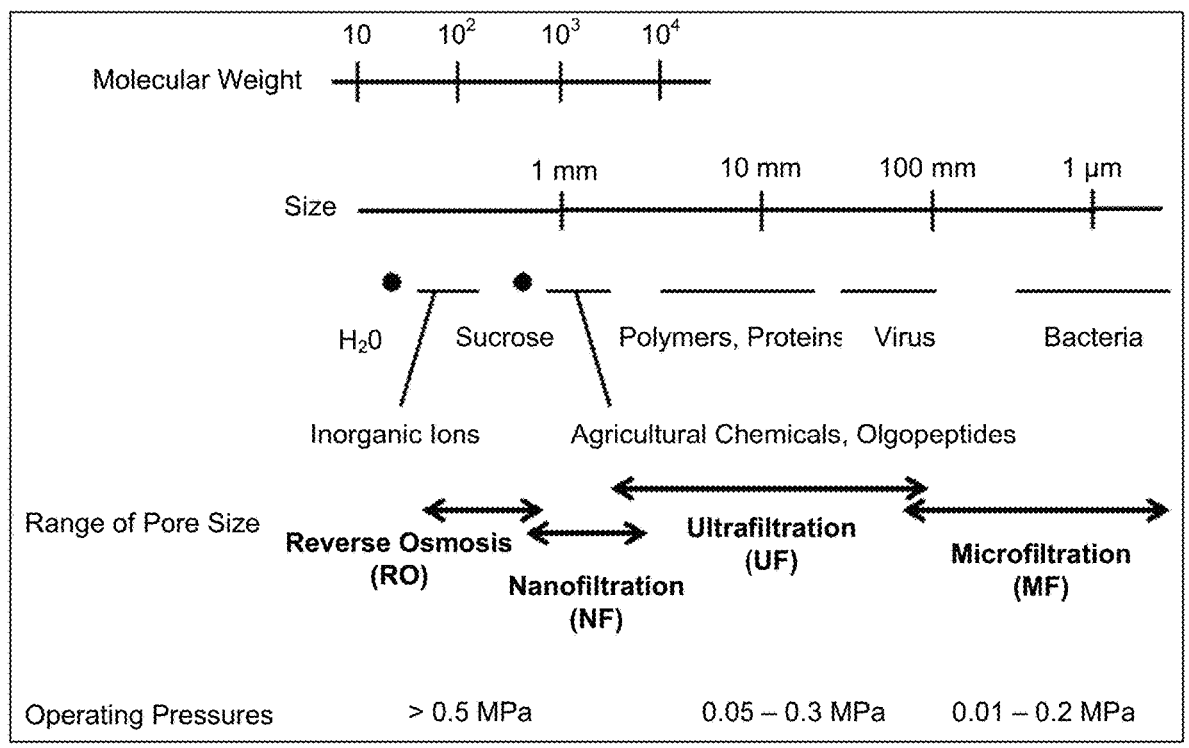
FIG. 1 shows the pore size range for different membrane separation processes.

In the accompanying drawings, like reference characters refer to the same or similar parts throughout the different views; and apostrophes are used to differentiate multiple instances of the same or similar items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 3:
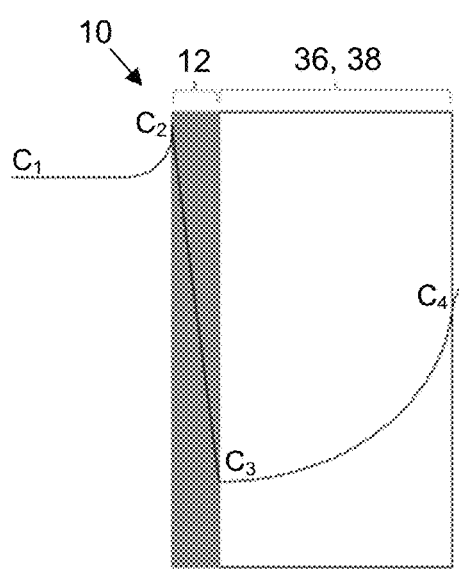
FIG. 3 plots the concentration profile of dissolved ions across an embodiment of the typical RO membrane, evidencing a severe internal concentration polarization.

The state-of-the-art RO membrane design does not work well with the CFRO process. The thick support layers (polysulfone and polyester) 14, 16 for the active layer 12 are great for mechanical integrity, but they cause severe internal concentration polarization, as shown in FIG. 3. The bulk concentration of the feed and draw streams are plotted as $C_1$ and $C_5$, respectively; however, the actual osmotic pressure gradient is between $C_2$ and $C_3$, which is greater than the gradient between $C_1$ and $C_5$, due to concentration polarization. Concentration polarization occurs when materials are selectively rejected or passed through at the interface of the membrane 10. If the concentration polarization happens outside of the membrane 10 (e.g., $C_1$ to $C_2$), it is called external concentration polarization; if the concentration polarization happens within the membrane 10 (e.g., $C_4$ to $C_3$), it is called internal concentration polarization.

The degree of internal concentration polarization is partially governed by the structural parameter, S, of the support layer(s) 12,14, which is defined as follows:

$$S = \frac{t\tau}{\epsilon}, \tag{2}$$

and $C_3$ can be expressed as follows:

$$C_3 = C_4 \exp\left(-\frac{JS}{D}\right) = C_5 \exp(-Jk)\exp\left(-\frac{JS}{D}\right), \tag{3}$$

where t is the thickness of the support layer; τ is the tortuosity of the support layer; ε is the porosity of the support layer; D is the diffusion coefficient of the salt; and k is the mass transfer coefficient determined by the flow conditions on the draw side. The larger the S value, the more severe the concentration polarization is—i.e., the lower $C_3$ value is. A state-of-the-art RO membrane has an S value on the order of 3-5 mm; an appropriate S value for a CFRO membrane, however, can be advantageously less than 1 mm and, in particular embodiments, is between 0.3-0.5 mm.

The S value can be calculated from a series of membrane characterization experiments. Pure water permeability, A, and a salt rejection parameter, R, are measured; and a mass transfer coefficient, k, is established in order to calculate the solute permeability coefficient, B. A solute diffusion experiment is conducted; and the previously calculated membrane parameters, A and B, are used to calculate a parameter for the support layer's resistance to solute diffusion, K, from the results of the diffusion experiment. A diffusion coefficient, D, is then estimated; and, finally, D and K are used to calculate the S value.

The pure water permeability constant, A, is measured in a pure water permeability experiment by supplying a pressurized stream of deionized water to the membrane and measuring the resulting pure-water reverse-osmosis trans-membrane flux, $J_w^{RO}$. Under these conditions, equation (1) simplifies to $J_w^{RO}=A(\Delta P)$, which can be easily solved for A. An example of suitable conditions for the pure-water permeability experiment is a trans-membrane pressure of 27.6 bar, a feed temperature of 25° C., and a crossflow velocity of 21.4 cm/s along the surface of the membrane 10. A lower pressure may be used for membranes 10 that cannot withstand a pressure of 27.6 bar.

The salt-rejection parameter, R, is measured in a salt-rejection experiment by supplying a pressurized stream of saline water to the membrane and measuring the difference in salinity between the feed stream and the permeate stream. An example of suitable conditions for the salt-rejection experiment is a trans-membrane pressure of 27.6 bar, a feed temperature of 25° C., a crossflow velocity of 21.4 cm/s along the surface of the membrane 10, and a feed solution consisting of a 50 mM concentration of NaCl in deionized water. A lower pressure may be used for membranes 10 that cannot withstand a pressure of 27.6 bar. The salinity of the feed (entering from the left of the membrane 10 in the orientation of FIG. 3) and permeate (exiting to the right of the membrane 10 in the orientation of FIG. 3) streams may be measured according to any suitable method known in the art. For example, methods for measuring the concentration of dissolved salt include inductively coupled plasma (ICP) spectroscopy (e.g, inductively coupled plasma optical emission spectroscopy). As one non-limiting example, an Optima 8300 inductively coupled plasma optical emission spectroscopy (ICP-OES) may be used. From the results of the salt-rejection experiment, R is calculated using equation (4), below, in which $c_p$ represents the salinity of the permeate; and $c_b$ represents the salinity of the feed.

$$R=1-c_p/c_b \quad (4)$$

The mass transfer coefficient, k, is established according to the geometry of the membrane and properties of the feed fluid. k is calculated according to the following equations:

$$k = \frac{ShD}{d_h}, \text{ where} \quad (5)$$

$$Sh = 1.85\left(\frac{Re \cdot Sc \cdot d_h}{L}\right)^{.33} \text{ for laminar flow conditions, and} \quad (6)$$

$$Sh = 0.04 Re^{0.75} Sc^{0.33} \text{ for turbulent flow conditions,} \quad (7)$$
and where $$Re = \frac{\rho V d_h}{\mu}; \text{ and} \quad (8)$$

$$Sc = \frac{\mu}{\rho D}. \quad (9)$$

In the set of equations, above, Sh represents the Sherwood number, D represents the diffusion constant of the draw solute (explained in further detail, below); $d_h$ represents the hydraulic diameter of the feed channel; L represents the length of the channel; Re represents the Reynolds number of the feed fluid; $\rho$ represents its density; V represents its crossflow velocity; $\mu$ represents its dynamic viscosity; and Sc represents the Schmidt number.

The solute permeability coefficient, B, is calculated from R, k, and the pure water reverse osmosis trans-membrane flux, $J_w^{RO}$, from the pure water permeability experiment, using equation (10), below.

$$B = J_w^{RO}\left(\frac{1-R}{R}\right)\exp\left(-\frac{J_w^{RO}}{k}\right) \quad (10)$$

K, the membrane support layer's resistance to solute diffusion is determined from the previously characterized A and B values, and flux results from a forward-osmosis experiment. In the forward-osmosis experiment, a saline draw solution is supplied to the permeate side of the membrane 10 (to the right of the membrane 10 in the orientation shown in FIG. 3); deionized water is supplied to the retentate side of the membrane 10 (to the left of the membrane 10 in the orientation shown in FIG. 3); and the trans-membrane flux, $J_w$, is measured. The membrane 10 is oriented such that the support layer 16 faces the draw solution and is operated without mesh spacers. An example of suitable conditions for the forward-osmosis experiment is a draw solution comprising a 1.0 M concentration of NaCl in deionized water, cross-flow velocities of 21.4 cm/s along the surface of the membrane 10, and feed and draw solution temperatures of 25° C. The relationship between osmotic pressures and NaCl concentrations in deionized water are well characterized. The salinity of the feed and permeate streams may be measured according to any suitable method known in the art. For example, methods for measuring the concentration of the dissolved salt include inductively coupled plasma (ICP) spectroscopy [e.g., inductively coupled plasma optical emission spectroscopy (ICP-OES)]. As one non-limiting example, an Optima 8300 ICP-OES may be used. Using the flux, $J_w$, the bulk osmotic pressure of the draw solution, $\pi_{D,b}$, and the osmotic pressure at the membrane surface on the feed side, $\pi_{F,m}$ (equal to 0 for deionized water)—the above measured from the forward-osmosis experiment—along with the previously determined A and B parameters, K can be calculated from the following equation:

$$K = \left(\frac{1}{J_w}\right)\ln\frac{B + A\pi_{D,b}}{B + J_w + A\pi_{F,m}}. \quad (11)$$

The diffusion coefficient, D, of the draw solute can be calculated using the estimates provided by equations (12) and (13), below. In these equations, C represents the molar concentration of NaCl in deionized water.

For NaCl concentrations between 0 and 0.5 M, $$D = -6.73 \times 10^{-8}C^5 + 9.84 \times 10^{-8}C^4 - \quad (12)$$
$$5.40 \times 10^{-8}C^3 + 1.39 \times 10^{-8}C^2 - 1.88 \times C^5 + 1.71 \times 10^{-9}.$$

For NaCl concentrations greater than 0.5 M, $$D=6.67\times10^{-12}C^2+1.33\times10^{-10}C+1.71\times10^{-9}. \quad (13)$$

Once K and D have been determined, the structural parameter, S, can finally be calculated using the following equation:

$$S=KD. \quad (14)$$

A forward-osmosis (FO) membrane can have an S value as low as 0.05 mm, but that is considered to be too low for a CFRO process because a support layer that has such a low S value is very thin and highly porous, the combination of which yield a membrane with poor mechanical properties. An FO membrane is designed to have a low S value and only has to withstand a pressure of 1-2 bar. A support layer that is too thin or too high in porosity may fail under the moderate hydraulic pressures required in the CFRO process.

Figure 4:
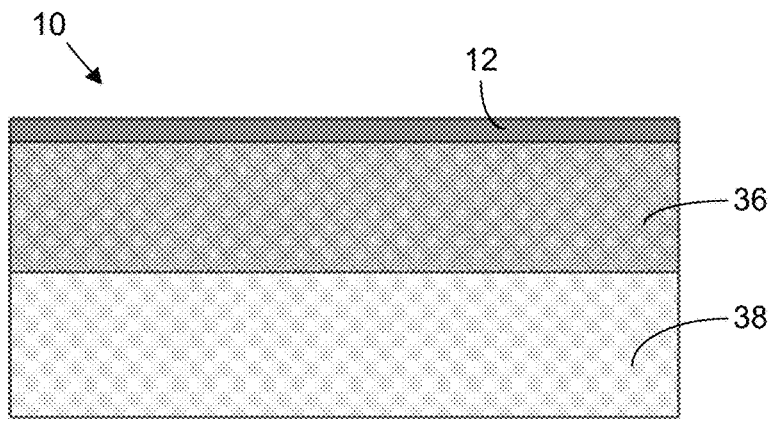
FIG. 4 is a schematic illustration of an embodiment of a counter-flow reverse osmosis (CFRO) membrane of this disclosure.

Osmotic Membrane:

A conventional support layer for an RO membrane is made with the phase inversion technique, and that process has resulted in a layer that generally has 40-70% porosity and high tortuosity. The membrane support layer 34 described herein (and illustrated in FIG. 4) is a composite of phase-inversion and electrospun-fiber sub-layers 36 and 38. An electrospun-fiber sub-layer 38 generally has a porosity of 80-90% and a low tortuosity. The porosity of the electrospun-fiber sub-layer 38 may be measured according to any suitable method known in the art. For example, methods for measuring the porosity include gravimetric methods in which the density of the electrospun-fiber sub-layer 38 is compared to the density of its constituent materials. In this method, a difference is taken between the density of the electrospun-fiber sub-layer 38 and the density of its constituent materials, and that difference is divided by the density of the constituent materials to determine the porosity. When a composite membrane is evaluated using this method, the porosity of each sub-layer 36 and 38 is determined separately using this approach. Using the composite structure 34 for the support layer, the phase-inversion sub-layer 36 can be made thinner, hence lowering the S value of the membrane 10.

Figure 2:
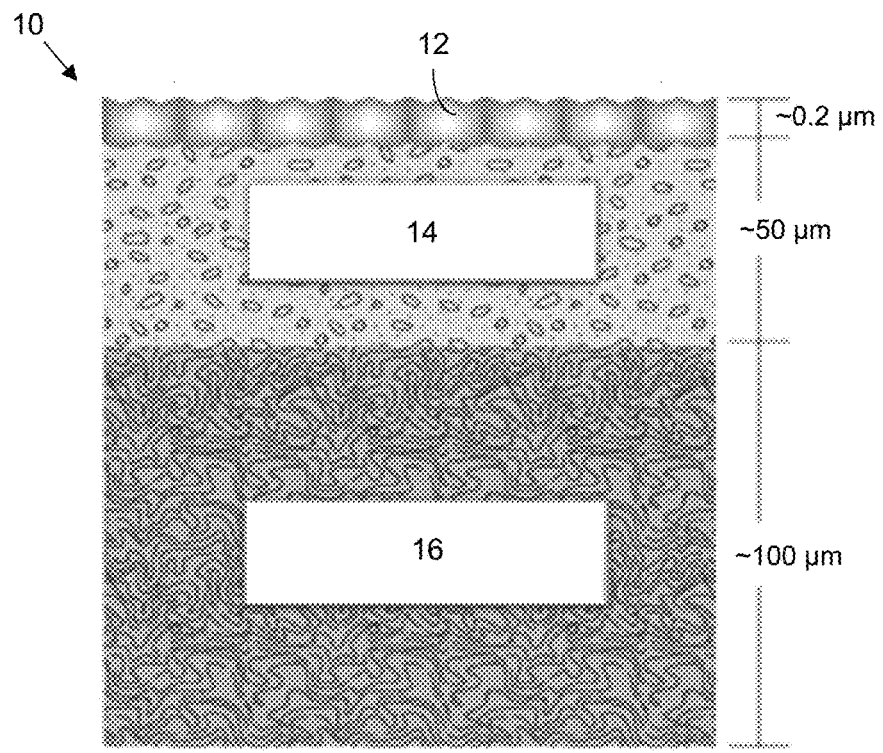
FIG. 2 illustrates the thin film composite structure of a typical RO membrane.

The membrane 10 of this disclosure can have a thin-film composite structure similar to that shown in FIG. 2; the polyester nonwoven layer 16, however, is eliminated or replaced by an electrospun-fiber sub-layer 36. The support layer is a composite of both phase-inversion and electrospun-fiber sub-layers 38 and 36 or just phase-inversion polysulfone 38. The active layer 12 can still be made of polyamide.

Figure 5:
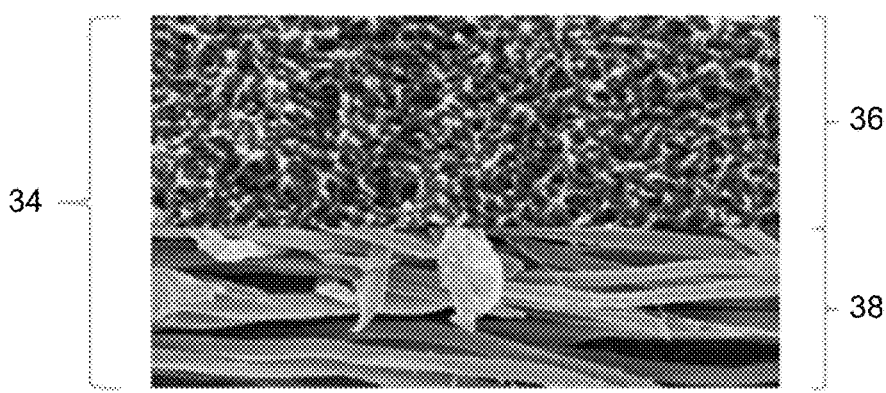
FIG. 5 is a composite scanning electron microscope (SEM) image showing the physical morphologies of the electrospun-fiber sub-layer and the phase-inversion sub-layer that comprise the composite support layer of the osmotic membrane. The composite support layer has a low structural parameter, S, yet is mechanically robust.

To fabricate this composite membrane 10, first, a 30-50-μm-thick electrospun-fiber sub-layer 38 is made. The measurement of sub-layer thickness can be verified with a micrometer or with scanning electron microsposcopy. The electrospun-fiber sub-layer 38 can be formed of polysulfone, polyethersulfone, nylon or other polymer that has strong mechanical properties. After formation of the electrospun-fiber sub-layer 38, the phase-inversion procedure is performed by casting the polymer solution on top of the electrospun-fiber sub-layer 38, and then immersing the resulting product into a non-solvent solution, such as water, to precipitate out the polymer, forming the phase-inversion sub-layer 36 10-30 μm thickness on the electrospun-fiber sub-layer 38, as shown in FIG. 5. The polymer used for phase inversion can advantaegeously be the same as that used for the electrospun-fiber sub-layer 38. Finally, a less-than 200-nm-thick active layer 12 is formed on top of the phase-inversion sub-layer 36 via interfacial polymerization. The active layer 12 can be made of polyamide, a result of polymerization between acid chloride and diamine.

In order to optimize between the S parameter and mechanical strength, the thickness of the phase-inversion sub-layer 36 and the electrospun-fiber sub-layer 38 can be adjusted. If the phase-inversion sub-layer 36 alone is strong enough and has a sufficiently low S value, the electrospun-fiber sub-layer 38 can be eliminated completely; however, membranes of this configuration may disadvantageously exhibit high internal concentration polarization under operation. Alternatively, if the mechanical strength of the membrane is too low, a thicker electrospun-fiber sub-layer may be used to increase the strength of the membrane with a lower affect on the S value, as compared with thickening the phase-inversion sub-layer.

The herein-described membrane cam be made into a spiral-wound or plate-frame module, with the support layer 34 facing the draw side and with the active layer 12 facing the feed side. Hydraulic pressure is applied on the feed side, and pure water permeates from the feed side to the draw side through the membrane 10.

The material used to fabricate the support layer 34 can be polysulfone or polyethersulfone. Other polymers that have a high mechanical strength can also be used [e.g., polyamide (TROGAMID T polyamide from Evonik Industries of Essen, Germany), polyimide, etc.]. The phase-inversion process for polysulfone and polyethersulfone is mature and can be readily commercialized.

Figure 6:
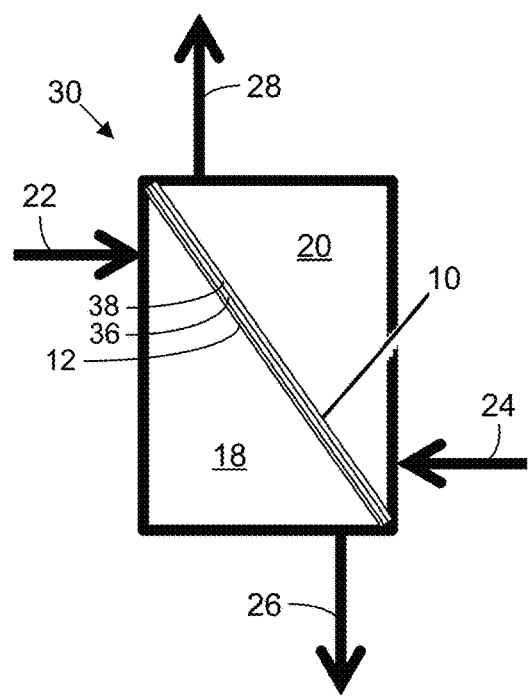
FIG. 6 is a schematic illustration of a counter-flow reverse osmosis (CFRO) system including a membrane of this disclosure.

CFRO Process:

A single counter-flow osmosis system in which embodiments of the herein-described membrane 10 can be used is shown in FIG. 6. The system comprises an osmotic membrane 10 with a first (retentate) side 18 and a second (permeate) side 20. An influent feed stream 22 is transported (e.g., via a pump in the feed conduit) across the first side 18, and an influent draw stream 24 is transported across the second side 20. This system can be used to perform reverse osmosis, for example, when the trans-membrane pressure gradient is greater than the osmotic-pressure gradient—i.e., when the difference between the hydraulic pressure on the first side 18 and the hydraulic pressure on the second side 20 is greater than the difference between the osmotic pressure on the first side 18 and the osmotic pressure on the second side 20. When the above condition is satisfied, water may be transported between the first side 18 and the second side 20 of the osmotic membrane 10 to produce a feed product stream 26 from the influent feed stream 22, and a draw product stream 28 from the influent draw stream 24.

The feed stream 22 can be flowed across the first side 18 of the osmotic membrane 10 along a first flow path that is substantially straight, U-shaped, serpentine, or of any other shape known in the art of membrane module design. The first flow path need not be a single flow path. It can be split into two or more parallel flow paths then rejoined into a single flow path. For example, the membrane module 30 can contain an inlet header directly fluidically connected to multiple flow paths within the membrane module 30, as well as an outlet header directly fluidically connected to the same flow paths such that the feed stream 22 entering the inlet header is divided into multiple flow paths, then rejoined into a single flow path before exiting the membrane module 30.

The draw stream 24 can be flowed across the second side 20 of the osmotic membrane 10 along a second flow path that is substantially straight, U-shaped, serpentine, or of any other shape known in the art of membrane module design. The second flow path need not be a single flow path. The draw stream 24 can be split into two or more parallel flow paths and then rejoined into a single flow path. For example, the membrane module 30 can contain an inlet header directly fluidically connected to multiple flow paths within the membrane module 30, as well as an outlet header directly fluidically connected to the same flow paths such that the draw stream 24 entering the inlet header is divided into multiple flow paths and then rejoined into a single flow path before exiting the membrane module 30.

The first and second flow paths can direct the flow of the feed stream 22 and the draw stream 24 in substantially opposite directions along the membrane 10 in a counter-flow configuration. While, in particular embodiments, the direction of the first flow path and the direction of the second flow path are substantially opposite at every point along the membrane 10, practical considerations in the design of the membrane module 30 may preclude this. For example, a spiral-wound membrane module 30 can comprise a centrally entering feed stream 22 that is distributed to one or more membrane envelopes from a feed section of a central tube. The centrally entering feed stream 22 can flow across a first side 18 of the one or more membrane envelopes in a U-shaped flow path to exit into a discharage section of the central tube. A second (draw) stream 24 can be distributed to a second side 20 of the one or more membrane envelopes from one lateral end of the spiral wound membrane module 30 to flow across the second side 20 in a straight path and exit into an outlet header on the opposite lateral end. To those skilled in the art, a spiral-wound membrane module 30, as described above, is still said to be in a counter-flow configuration when the inlet to the feed section of the central tube is located proximate to the lateral outlet header and the outlet of the discharage section of the central tube is located proximate to the lateral inlet header. While it is advantageous for the counter-flow reverse osmosis module to have a counter-flow configuration, many of the benefits can be obtained using a cross-flow configuration, particularly where multiple membranes 10 are arranged in series.

Figure 7:
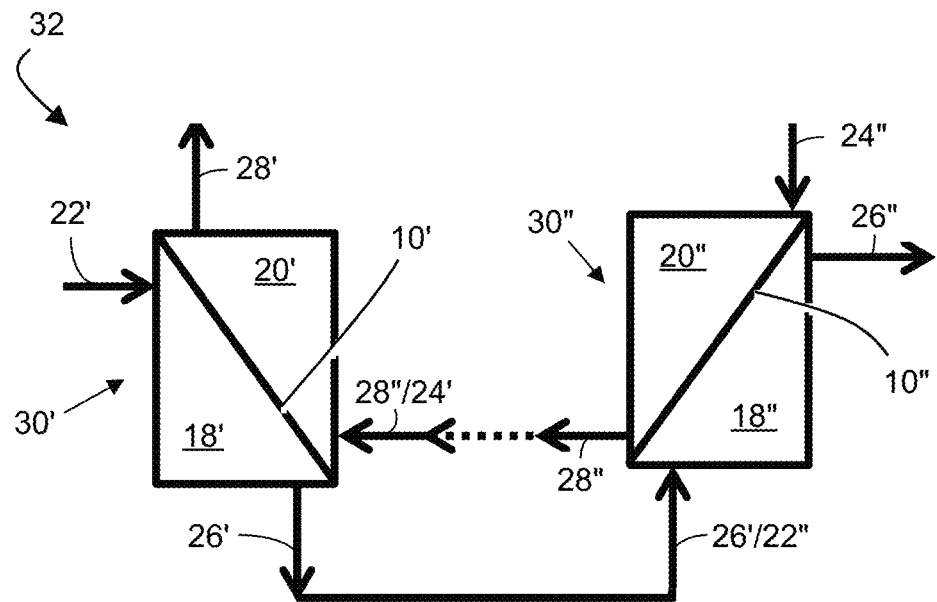
FIG. 7 is a schematic illustration of a CFRO system including multiple membrane modules arranged in series.

In additional embodiments, the membrane system 32, as shown in FIG. 7, can comprise multiple membranes 10 and/or multiple membrane modules 30 arranged in series. An additional membrane module 30" connected in series to the first membrane module 30' can comprise a first (retentate) side 18" and a second (permeate) side 20" across which an additional feed stream and additional draw stream can respectively flow. In this configuration, the feed product stream 26' is directed to the inlet of the retentate side 18" of the additional membrane 10" to form the additional influent feed stream 22". The additional draw product stream 28" is directed from the outlet of the second (permeate) side 20" of the additional membrane module 30" to the second (permeate) side 20' of the membrane module 30' to form the influent draw stream 24'. Additional pumps and/or compressors can be positioned between membrane modules 30 arranged in series to circulate the feed and draw flows. These additional pumps and/or compressors can supply additional hydraulic pressure to make up for pressure lost within the membrane 10 or for the purpose of increasing flux.

The membrane module design can be of any configuration known in the art that allows the flow of a feed stream and a draw stream. For example, the counter-flow reverse osmosis module 30 can be of a spiral-wound configuration, a flat-plate configuration, or a hollow-fiber-membrane configuration. The above list is not intended to be limiting. Alternatively, the membrane module 30 can comprise multiple membranes 10 arranged in parallel.

Figure 8:
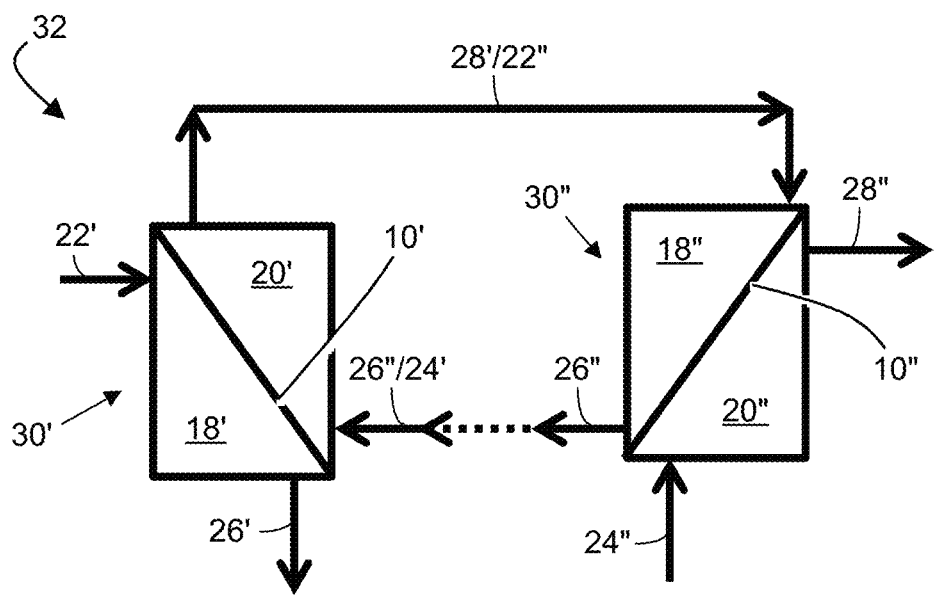
FIG. 8 is a schematic illustration of a multi-staged membrane system.

The membrane module 30 shown in FIG. 6 can be connected to similar systems to form a multi-staged membrane system 32, as shown in FIG. 8. The multi-staged membrane system 32 comprises a first osmotic-membrane module 30', which has a first (retentate) side 18' and a second (permeate) side 20" separated by a first membrane 10'. The membrane system 32 also comprises a second osmotic membrane module 30", which has a first (retentate) side 18" and a second (permeate) side 20". An influent feed stream 22' is transported across the first side 18' of the first membrane 10', and a first influent draw stream 24' is transported across the second side 20' of the first membrane 10'. The first membrane 10' can be used to perform reverse osmosis, for example, when the trans-membrane pressure gradient is greater than the osmotic pressure gradient. This is, when the difference between the hydraulic pressure on the first side 18' and the hydraulic pressure on the second side 20' is greater than the difference between the osmotic pressure on the first side 18' and the osmotic pressure on the second side 20'. When the above condition is satisfied, water may diffuse through the first membrane 10' from the first side 18' to the second side 20' to produce a first feed product stream 26' from the first influent feed stream 22' and an intermediate stream 28'/22" from the first influent draw stream 24'.

The intermediate stream 28'/22" is transported to a second membrane module 30" comprising the second osmotic membrane 10". The intermediate stream 28'/22" is transported across the first (retentate) side 18' of the second membrane 10", and a second influent draw stream 24" is transported across the second (permeate) side 20" of the second membrane 10". The second membrane 10" can be used to perform reverse osmosis, for example, when the trans-membrane pressure gradient is greater than the osmotic pressure gradient—i.e., when the difference between the hydraulic pressure on the first side 18" and the hydraulic pressure on the second side 20" is greater than the difference between the osmotic pressure on the first side 18" and the osmotic pressure on the second side 20". When the above condition is satisfied, water may diffuse through the second membrane 10" from the first side 18" to the second side 20" to produce a second feed product stream 26" from the intermediate stream 28'/22" and a second draw product stream 28" from the second influent draw stream 24". The second feed product stream 26" can be transported to the second side 20' of the first membrane 10' to form the first influent draw stream 24'.

When reverse osmosis is performed in both the first osmotic membrane and the second osmotic membrane, the intermediate stream 28'/22" may be more dilute than the first influent feed stream 22', and the second draw product stream 28" may, in turn, be more dilute than the intermediate stream 28'/22". If the second draw product stream 28" is sufficiently dilute, it may be desalinated using a conventional reverse-osmosis method. A purified permeate stream and a concentrated retentate stream may be produced from the conventional reverse-osmosis method. When the system shown in FIG. 8 is coupled with a conventional reverse osmosis system, the concentrated retentate stream from the conventional reverse osmosis system (not shown) can be transported to the second side 20" of the second membrane 10" to form the second draw influent stream 24"; and the purified permeate stream from the reverse osmosis system (not shown) can be removed from the membrane system 32 as a final product.

Alternatively, additional counter-flow reverse-osmosis membrane modules 30 can be connected in series to the module 30" comprising the second membrane 10", in the same way that the module 30" comprising the second membrane 10" is connected in series to the module 30' comprising the first membrane 10', to allow the production of successively more-dilute draw product streams 28 when reverse osmosis methods are performed therein. When additional membrane modules 30 are connected downstream of the module 30" comprising membrane 10", the second draw product stream 28″ is transported to the first side 18 of the first additional membrane 10. An osmotic process can be performed therein to produce an additional feed product stream 26 that can be transported back to the module 30″ comprising the membrane 10″ to form the second influent draw stream 24″.

Other Processes:

The herein-described membrane 10 can also be used advantageously in other osmotic processes comprising a draw stream and/or hydraulic pressure. These processes include, but are not limited to, forward osmosis, pressure-assisted forward osmosis, reverse osmosis, and pressure-retarded osmosis.

Forward osmosis is generally defined as an osmotic process in which a feed stream is directed to one side of an osmotic membrane, and a draw stream is directed to the opposite side of the osmotic membrane, wherein the osmotic pressure of the draw stream is greater than the osmotic pressure of the feed stream, and the two streams are fed to the osmotic membrane at approximately the same hydraulic pressures. Because the draw stream includes solutes, an internal concentration polarization may form in forward-osmosis methods. Thus, the herein-described membrane can be used advantageously over other membranes for forward-osmosis processes and methods due to the herein-described membrane's resistance to internal concentration polarization.

Pressure-assisted forward osmosis is generally defined as an osmotic process in which a feed stream is directed to one side of an osmotic membrane while a draw stream is directed to the opposite side of the osmotic membrane, wherein the osmotic pressure of the draw stream is greater than the osmotic pressure of the feed stream, and wherein the hydraulic pressure of the feed stream is greater than the hydraulic pressure of the draw stream. In pressure-assisted forward osmosis processes, the additional hydraulic pressure serves to increase flux through the membrane. Because the draw stream contains solutes, an internal concentration polarization may form in pressure-assisted forward-osmosis methods. Thus, the herein-described membrane can be used advantageously over other membranes for pressure-assisted forward-osmosis processes and methods due to its resistance to internal concentration polarization. Because the feed stream is supplied at a greater hydraulic pressure than that at which the draw stream is supplied, the membrane bears the force of the hydraulic pressure difference. Thus, the herein-described membrane can be used advantageously over other membranes for pressure-assisted forward osmosis processes and methods due to its high mechanical strength.

Reverse osmosis is generally defined as an osmotic process in which a feed stream is directed to one side of an osmotic membrane and in which the hydraulic-pressure gradient across the membrane is greater than the osmotic-pressure gradient across the membrane. Reverse osmosis is typically operated without a draw stream, so the fluid on the opposite side of the membrane typically consists of permeate only. Because the feed stream is supplied at a greater hydraulic pressure than the fluid on the opposite side of the membrane, the membrane bears the force of the hydraulic pressure difference. Thus, the herein-described membrane can be used advantageously over other membranes for reverse osmosis processes and methods due to its high mechanical strength.

Pressure-retarded osmosis is generally defined as an osmotic process in which a feed stream is directed to one side of an osmotic membrane, and a draw stream is directed to the opposite side of the osmotic membrane, wherein the osmotic pressure of the draw stream is greater than the osmotic pressure of the feed stream, and wherein the hydraulic pressure of the draw stream is greater than the hydraulic pressure of the feed stream but not so much greater that the hydraulic-pressure gradient is greater than the osmotic-pressure gradient. The permeation of water through the membrane from the feed side to the draw side generates hydraulic pressure that can be used to drive a turbine. Because the draw stream contains solutes, an internal concentration polarization may form in forward-osmosis methods. Thus, the herein-described membrane can be used advantageously over other membranes for forward-osmosis processes and methods due to the herein-described membrane's resistance to internal concentration polarization. Because the draw stream is supplied at a greater hydraulic pressure than the feed stream, the membrane bears the force of the hydraulic-pressure difference. Thus, the herein-described membrane can be used advantageously over other membranes for pressure-retarded osmosis processes and methods due to its high mechanical strength.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. An osmotic membrane, comprising:
an active layer that selectively allows passage of water molecules but rejects at least some dissolved ions; and
a composite support layer including a side that is bonded to the active layer, wherein the composite support layer comprises:
a) an electrospun-fiber sub-layer, wherein the electrospun-fiber sub-layer has a substantially lower structural parameter, S, than a structural parameter, S, of the phase-inversion sub-layer, wherein the structural parameter, S, is defined as follows:

$$S = \frac{t \cdot \tau}{\varepsilon}$$

wherein t represents layer thickness, τ represents layer tortuosity, and ε represents layer porosity; and
b) a phase-inversion sub-layer, wherein the phase-inversion sub-layer is bonded to the active layer.

2. The osmotic membrane of claim 1, further comprising a non-woven fabric layer bonded to the composite support layer, wherein the composite support layer is between the active layer and the non-woven fabric layer.

3. The osmotic membrane of claim 1, wherein the phase-inversion sub-layer has a porosity of 40-80% by volume.

4. The osmotic membrane of claim 1, wherein the phase-inversion sub-layer has a porosity of 40-50% by volume.

5. The osmotic membrane of claim 1, wherein the electrospun-fiber sub-layer has a porosity of at least 80% by volume, wherein the porosity of the electrospun-fiber sub-layer is substantially greater than the porosity of the phase-inversion sub-layer.

6. The osmotic membrane of claim 1, wherein the phase-inversion sub-layer offers a mechanical strength that is substantially greater than a mechanical strength of the electrospun fiber layer.

7. The osmotic membrane of claim 1, wherein the phase-inversion sub-layer has a thickness of 10-50 μm.

8. The osmotic membrane of claim 1, wherein the phase-inversion sub-layer has a thickness that is no more than 60% of the thickness of the entire osmotic membrane.

9. The osmotic membrane of claim 1, wherein the electrospun-fiber sub-layer has a thickness of 30-50 μm.

10. The osmotic membrane of claim 1, wherein the active layer has a thickness of 50-200 nm.

11. The osmotic membrane of claim 1, wherein the electrospun-fiber sub-layer comprises a composition selected from a group consisting of: polysulfone, polyethersulfone, polyamide, and polyimide.

12. The osmotic membrane of claim 1, wherein the phase-inversion sub-layer comprises a composition selected from a group consisting of: polysulfone, polyethersulfone, polyamide, and polyimide.

13. The osmotic membrane of claim 1, wherein the electrospun-fiber sub-layer and phase-inversion sub-layer comprise the same composition.

14. The osmotic membrane of claim 1, wherein the phase-inversion sub-layer is between the active layer and the electrospun-fiber sub-layer.

15. The osmotic membrane of claim 1, wherein the active layer comprises a polyamide.

16. An osmotic membrane, comprising:
an active layer that selectively allows passage of water molecules but rejects at least some dissolved ions; and
a composite support layer including a side that is bonded to the active layer, wherein the composite support layer has a structural parameter, S, less than 1 mm, wherein the structural parameter, S, is defined as follows:

$$S = \frac{t \cdot \tau}{\varepsilon}$$

wherein t represents layer thickness, τ represents layer tortuosity, and ε represents layer porosity, and wherein the composite support layer comprises:
a) an electrospun-fiber sub-layer; and
b) a phase-inversion sub-layer, wherein the phase-inversion layer is bonded to the active layer.

17. The osmotic membrane of claim 16, wherein the composite support layer has a structural parameter, S, in a range from 0.3 to 0.5 mm.

18. A method for fabricating an osmotic membrane, comprising:
electrospinning an electrospun-fiber sub-layer;
casting a phase-inversion sub-layer on the electrospun-fiber sub-layer to form a composite support layer, wherein the electrospun-fiber sub-layer has a substantially lower structural parameter, S, than a structural parameter, S, of the phase-inversion sub-layer, wherein the structural parameter, S, is defined as follows $$S = \frac{t \cdot \tau}{\varepsilon}$$

wherein t represents layer thickness, τ represents layer tortuosity, and ε represents layer porosity; and
forming an active layer on the phase-inversion sub-layer, wherein the active layer selectively allows passage of water molecules but rejects at least some dissolved ions.

19. The method of claim 18, wherein the phase-inversion sub-layer is cast by casting a polymer solution on top of the electrospun-fiber sub-layer and then immersing the polymer solution into a liquid in which the polymer is non-solvent to precipitate out the polymer.

20. A method for performing reverse osmosis, comprising:
utilizing a reverse osmosis membrane, comprising:
a) an active layer that selectively allows passage of water molecules but rejects at least some dissolved ion;
b) a composite support layer including a bonded side that is bonded to the active layer and a draw side opposite from the bonded side, wherein the composite support layer comprises:
i) an electrospun-fiber sub-layer; and
ii) a phase-inversion sub-layer, wherein the phase-inversion sub-layer is bonded to the active layer, and wherein the electrospun-fiber sub-layer has a substantially lower structural parameter, S, than a structural parameter, S, of the phase-inversion sub-layer, and wherein the structural parameter, S, is defined as follows:

$$S = \frac{t \cdot \tau}{\varepsilon}$$

wherein t represents layer thickness, τ represents layer tortuosity, and ε represents layer porosity;

flowing a feed liquid comprising water and dissolved ions at a first pressure across a feed side of the active layer opposite from the side of the active layer that is bonded to the composite support layer;

flowing a draw liquid at a second pressure that is lower than the first pressure along a draw side of the composite support layer opposite from the bonded side of the composite support layer; and using the active layer to retain at least some of the dissolved ions from the feed liquid, as retentate while passing purified water as permeate through the active layer and through the composite support layer into the draw liquid.

21. The method of claim 20, wherein the feed liquid applies a pressure of at least 0.5 MPa against the active layer.

22. The method of claim 20, wherein the feed liquid further comprises at least one of the following: another chemical, a polymer, a protein, viruses, and bacteria.

23. The method of claim 22, wherein the feed liquid comprises at least one of the following dissolved ions: sodium, calcium, magnesium, chlorine, bromine, strontium, barium, carbonate, bicarbonate, and sulfate, bisulfate, and dissolved silica ions.

24. The method of claim 20, wherein the feed liquid has a concentration of dissolved ions of at least 50,000 parts per million.

25. The method of claim 20, wherein the feed liquid and the draw liquid respectively flow in opposite directions along the active layer and along the composite support layer.

* * * * *